June 6, 1961
W. A. LOBDELL
2,987,333
SPRING RETAINER CLIP
Filed Sept. 29, 1958
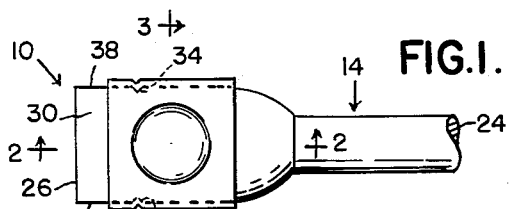
FIG.I.
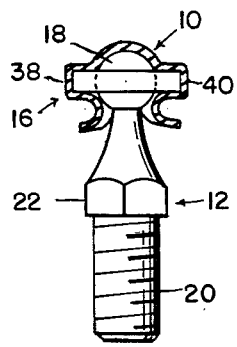
FIG.3.
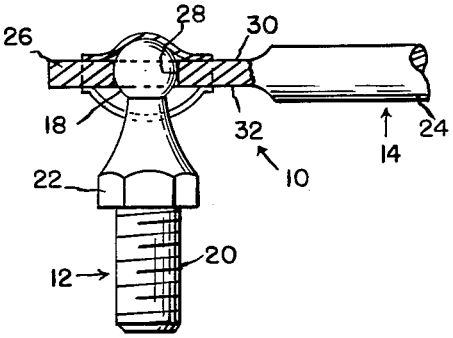
FIG.2.
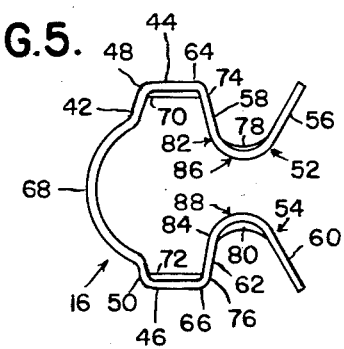
FIG.5.
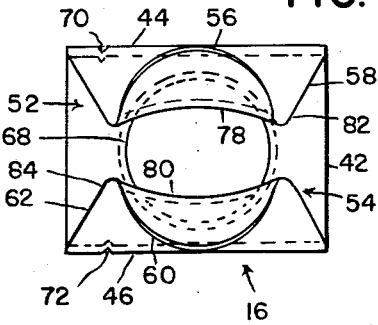
FIG.4.
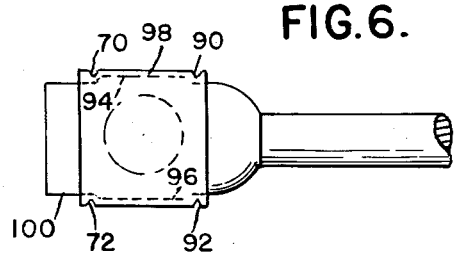
FIG.6.
INVENTOR.
WEBSTER A. LOBDELL
BY *Whittemore*
*Hulbert and Belknap*
ATTORNEYS United States Patent Office 2,987,333
Patented June 6, 1961

2,987,333
SPRING RETAINER CLIP
Webster A. Lobdell, Detroit, Mich., assignor to Claude Sintz, Inc., Detroit, Mich., a corporation of Michigan
Filed Sept. 29, 1958, Ser. No. 764,146
1 Claim. (Cl. 287—90)

This invention relates generally to ball joints and refers more particularly to an improvement in a ball-retaining holder for such joints comprising a spring retainer clip.

In the production of ball joints and particularly in the maintenance and repair of operating assemblies, such as accelerator throttle linkages using ball joints, it is often necessary to connect and disconnect the ball joint. In the past disconnectable ball joints have been complicated, requiring time and skill to connect and disconnect them.

Therefore it is an object of this invention to provide a ball joint which is easily connected and disconnected without the use of tools.

Another object is to provide means connecting the members of a ball joint which will allow limited universal movement thereof and will be easily connected and disconnected.

Another object is to provide a spring retainer clip for disconnectably holding two mating members in a ball joint.

Another object is to provide a spring retainer clip for a ball joint having means included therein for securing the clip in a fixed position relative to said joint when the joint is in assembly.

Another object is to provide a spring retainer clip having a base with a recess therein, two sides each having a groove therein and inwardly extending saddle portions for disconnectably holding a ball joint in assembly.

Another object is to provide a disconnectable ball joint which is simple in construction, economical to produce and efficient in use.

The foregoing, as well as other objects of this invention, will be made more apparent as this description proceeds, especially when considered in connection with the accompanying drawing, wherein:

FIGURE 1 is a plan view of a ball joint and spring retaining clip according to the invention;

FIGURE 2 is a side view of the construction of FIGURE 1 partially in section along line 2—2 in FIGURE 1;

FIGURE 3 is an end view of the construction of FIGURE 1 partially in section along line 3—3 in FIGURE 1;

FIGURE 4 is an end view of a spring retaining clip according to the invention;

FIGURE 5 is a plan view of the clip of FIGURE 4;

FIGURE 6 is a plan view of a modification of the ball joint and spring retaining clip illustrated in FIGURES 1-5.

The embodiment of the invention illustrated in FIGURES 1-5 comprises a ball joint 10 including a ball member 12, a holding member 14 and a spring retaining clip 16. As illustrated in FIGURES 1-3, the ball member 12 and holding member 14 form a ball joint disconnectably held in assembly by spring retaining clip 16.

Ball member 12 may be of any suitable type and is illustrated in FIGURES 2 and 3 as being a metal fitting having a ball 18 at one end, a threaded circular shaft 20 at the other end and having a central portion 22 hexagonal in cross section. The threaded shaft 20 may be used to correctly position ball joint 10 in a mechanical linkage (not shown). The hexagonal central section 22 is provided to facilitate the adjustment of ball member 12 in the mechanical linkage. It provides means to easily screw shaft 20 into or out of a mating section in the linkage thereby adjusting the position of ball end 18 and therefore ball joint 10.

Holding member 14, as illustrated best in FIGURES 1 and 2, is a circular shaft which may be connected at end 24 to a mechanical linkage (not shown). End 26 of holding member 14 is coined into the shape illustrated to form a generally flat rectangular volume having a bore 28 therethrough between parallel faces 30 and 32 and having grooves 34 and 36 laterally across sides 38 and 40 thereof. Bore 28 is slightly larger in diameter than ball end 18 of ball member 12 so that ball end 18 may be removably inserted in bore 28. The perpendicular distance between faces 30 and 32 is slightly less than the diameter of ball end 18 so that ball end 18 protrudes from both sides 30 and 32 when it is inserted in bore 28 thereby facilitating the retaining action of spring clip 16. Grooves 34 and 36 in sides 38 and 40 cooperate with spring clip 16 to hold clip 16 in place in the assembled ball joint 10.

Spring clip 16, as best shown in FIGURES 4-6, includes a rectangular base member 42, two rectangular side members 44 and 46 attached to opposite edges 48 and 50 of base member 42, as illustrated, and two saddle members 52 and 54 having skirt portions 56 and 58 and skirt portions 60 and 62 respectfully attached to the outer edges 64 and 66 of rectangular sides 44 and 46. The saddle members 52 and 54 extend toward each other, as illustrated. Base member 42 is provided with an outwardly extending recess 68 in the form of a spherical segment in the center thereof. Recess 68 is formed to receive the end of ball member 18 protruding through bore 28, as shown in FIGURES 2 and 3. Rectangular sides 44 and 46 are provided with lateral linear indentations 70 and 72, as illustrated, which cooperate with grooves 34 and 36 in sides 38 and 40 on end 26 of holding member 14 to secure retaining clip 16 in assembly in ball joint 10 as previously mentioned. Saddle members 52 and 54 in the shape illustrated include skirt portions 56 and 60 in the form of half-circular tabs extending outwardly from the spring clip 16, which are provided as an aid in installation and removal of clip 16 from ball joint 10. Skirts 58 and 62 of saddle members 52 and 54 are generally trapezoidal in form as shown, having the bases 74 and 76 thereof connected to the outstanding edges 64 and 66 of sides 44 and 46. Skirts 56 and 58 and skirts 60 and 62 are connected by arcuate folds 78 and 80 completing each saddle member. The inner surface of skirts 58 and 62 along the edges 82 and 84 and the inner surfaces 86 and 88 of arcuate folds 78 and 80 cooperate to hold ball end 18 of ball member 12 securely within bore 28 in holding member 14 in the assembled ball joint 10, allowing for limited universal movement of the ball member 12. Retaining clip 16 may be made of spring steel.

In FIGURE 6 there is illustrated a slightly modified ball joint and spring retainer clip according to this invention. The spring retainer clip shown in FIGURE 6 in assembly in a ball joint has transverse linear indentations 70 and 72 as does the clip illustrated in FIGURES 4 and 5 and is further provided with similar indentations 90 and 92 at the other end of the clip. Indentations 70 and 90 and indentations 72 and 92 form therebetween shallow interior pockets 94 and 96 respectively in the inner walls of sides 44 and 46 of the clip. The coined end of the holding member in the ball joint of FIGURE 6 is formed with a center section 98 which is wider than the end sections thereof in the manner illustrated so that center section 98 extends into pockets 94 and 96 in assembly. The relatively narrow end section 100 of the holding member allows the clip to be easily inserted thereon. The center section 98 of the holding member in conjunction with pockets 94 and 96 serve to hold the retaining clip in assembly on the holding member.

In assembly, ball end 18 of ball member 12 is inserted in bore 28. Clip 16 is then inserted over the coined end 26 of holding member 14 and forced into position by advancement in a direction parallel to the axis of holding member 14, the clip springing over ball end 18 and around neck 82 of ball member 12 and locking in position in grooves 34 and 36. Alternatively, clip 16 may be inserted on coined end 26 and locked in grooves 34 and 36 and ball end 18 of ball member 12 may then be inserted in bore 20 by springing the clip 16 so that arcuate folds 78 and 80 allow the ball end 18 to pass. Either method of assembly is uncomplicated and requires the use of no tools. Disassembly of the ball joint 10 by reverse operations is equally simple.

The drawing and the foregoing specification constitute a description of the improved ball joint retaining holder in such full, clear, concise and exact terms as to enable any person skilled in the art to practice the invention, the scope of which is indicated by the appended claim.

What I claim as my invention is:

A ball joint assembly comprising a first elongated member having a flat end with a lateral bore therethrough and with a central section enlarged transversely of said bore, a second member having an end in the form of a ball, said ball being inserted within said bore, and a retaining clip adapted to wrap around said flat end of said first member to hold said first and second members in assembly and including sides adjacent sides of said flat end of said first member and a transverse indentation near each end of each of said sides of said retaining clip forming a shallow pocket in each side of said retaining clip between said indentations receiving the enlarged section of said first member whereby said clip is held in position on the first member.

References Cited in the file of this patent
UNITED STATES PATENTS

| | | |
|---|---|---|
| 2,530,554 | Tinnerman | Nov. 21, 1950 |
| 2,854,266 | Dies | Sept. 30, 1958 |